United States Patent
Cordeiro et al.

(10) Patent No.: US 9,906,282 B2
(45) Date of Patent: Feb. 27, 2018

(54) APPARATUS, SYSTEM AND METHOD OF MULTI-USER WIRELESS COMMUNICATION

(71) Applicant: INTEL IP CORPORATION, Santa Clara, CA (US)

(72) Inventors: Carlos Cordeiro, Portland, OR (US); Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/473,839

(22) Filed: Mar. 30, 2017

(65) Prior Publication Data

US 2017/0207833 A1 Jul. 20, 2017

Related U.S. Application Data

(63) Continuation of application No. 14/748,587, filed on Jun. 24, 2015.
(Continued)

(51) Int. Cl.
*H04W 28/06* (2009.01)
*H04W 84/02* (2009.01)
(Continued)

(52) U.S. Cl.
CPC ........ *H04B 7/0452* (2013.01); *H04W 28/065* (2013.01); *H04W 80/02* (2013.01); *H04W 28/06* (2013.01)

(58) Field of Classification Search
CPC . H04W 28/06; H04W 28/065; H04W 72/048; H04W 72/121; H04W 72/1263;
(Continued)

(56) References Cited

U.S. PATENT DOCUMENTS

| 8,422,474 B2 | 4/2013 | Park et al. |
| 9,014,212 B2 | 4/2015 | Park et al. |

(Continued)

FOREIGN PATENT DOCUMENTS

| WO | 2011034753 | 3/2011 |
| WO | 2011072164 | 6/2011 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

Primary Examiner — Ahmed Elallam
(74) Attorney, Agent, or Firm — Shichrur & Co.

(57) ABSTRACT

Some demonstrative embodiments include apparatuses, devices, systems and methods of multi-user (MU) wireless communication. For example, a wireless station may be configured to generate a MU Physical Layer Convergence Protocol (PLCP) Protocol Data Unit (PPDU) including a header field and a plurality of Media Access Control (MAC) Protocol Data Units (MPDUs) to a respective plurality of users, the header field including an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and process transmission of the MU PPDU to the plurality of users over a wireless communication band.

38 Claims, 8 Drawing Sheets

Related U.S. Application Data

(60) Provisional application No. 62/154,893, filed on Apr. 30, 2015.

(51) Int. Cl.
*H04B 7/04* (2017.01)
*H04B 7/0452* (2017.01)
*H04W 80/02* (2009.01)

(58) Field of Classification Search
CPC ....... H04W 4/06; H04W 80/02; H04W 99/00; H04L 1/008; H04L 1/0083; H04L 1/0079; H04L 5/0094; H04L 69/22; H04L 27/2602; H04L 27/2608; H04L 5/0053; H04L 69/324; H04L 2025/03815; H04L 5/0044; H04B 7/0452; H04B 7/0413; H04B 7/0697
See application file for complete search history.

(56) References Cited

U.S. PATENT DOCUMENTS

| | | | |
|---|---|---|---|
| 9,288,017 B2* | 3/2016 | Choi | H04L 1/0083 |
| 9,596,682 B2* | 3/2017 | Seok | H04L 27/2602 |
| 9,634,794 B2* | 4/2017 | Lee | H04L 1/0009 |
| 2007/0014237 A1 | 1/2007 | Nishibayashi et al. | |
| 2007/0230454 A1 | 10/2007 | Ginzburg et al. | |
| 2011/0069688 A1 | 3/2011 | Zhang et al. | |
| 2011/0134816 A1 | 6/2011 | Liu et al. | |
| 2012/0020312 A1 | 1/2012 | Lv et al. | |
| 2012/0195302 A1 | 8/2012 | Park et al. | |
| 2012/0218981 A1 | 8/2012 | Lee et al. | |
| 2012/0320896 A1 | 12/2012 | Choi et al. | |
| 2012/0327838 A1 | 12/2012 | Seok | |
| 2013/0177096 A1 | 7/2013 | Park et al. | |
| 2013/0208715 A1 | 8/2013 | Roh et al. | |
| 2013/0229996 A1 | 9/2013 | Wang et al. | |
| 2016/0057657 A1 | 2/2016 | Seok | |
| 2016/0119811 A1* | 4/2016 | Merlin | H04L 1/00 370/329 |
| 2016/0164800 A1* | 6/2016 | Eitan | H04L 47/80 370/389 |
| 2016/0227569 A1 | 8/2016 | Wang et al. | |
| 2016/0255660 A1* | 9/2016 | Son | H04B 7/0491 370/329 |
| 2016/0285608 A1 | 9/2016 | Kwon et al. | |
| 2016/0309457 A1* | 10/2016 | Eitan | H04L 1/0079 |
| 2016/0315681 A1 | 10/2016 | Moon et al. | |
| 2016/0323861 A1 | 11/2016 | Cordeiro et al. | |
| 2017/0111143 A1* | 4/2017 | Seok | H04L 1/0091 |
| 2017/0187486 A1* | 6/2017 | Lee | H04L 1/0009 |

FOREIGN PATENT DOCUMENTS

| | | |
|---|---|---|
| WO | 2013122377 | 8/2013 |
| WO | 2014123358 | 8/2014 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

International Search Report and Written Opinion for PCT/US2016/023672, dated Jun. 29, 2016, 11 pages.

Office Action for U.S. Appl. No. 14/748,587 dated Mar. 10, 2017, 15 pages.

Notice of Allowance for U.S. Appl. No. 14/748,587, dated Sep. 12, 2017, 9 pages.

International Preliminary Report on Patentability for PCT /US2016/023872, dated Nov. 9, 2017, 8 pages.

* cited by examiner

APPARATUS, SYSTEM AND METHOD OF MULTI-USER WIRELESS COMMUNICATION

CROSS REFERENCE

This application claims the benefit of and priority from U.S. Provisional Patent Application No. 62/154,893 entitled "Apparatus, System and Method of Multi-User Wireless Communication", filed Apr. 30, 2015, the entire disclosure of which is incorporated herein by reference.

TECHNICAL FIELD

Embodiments described herein generally relate to multi-user (MU) wireless communication.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

Some Specifications, e.g., an IEEE 802.11ad Specification, may be configured to support a Single User (SU) system, in which a Station (STA) cannot transmit frames to more than a single STA at a time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
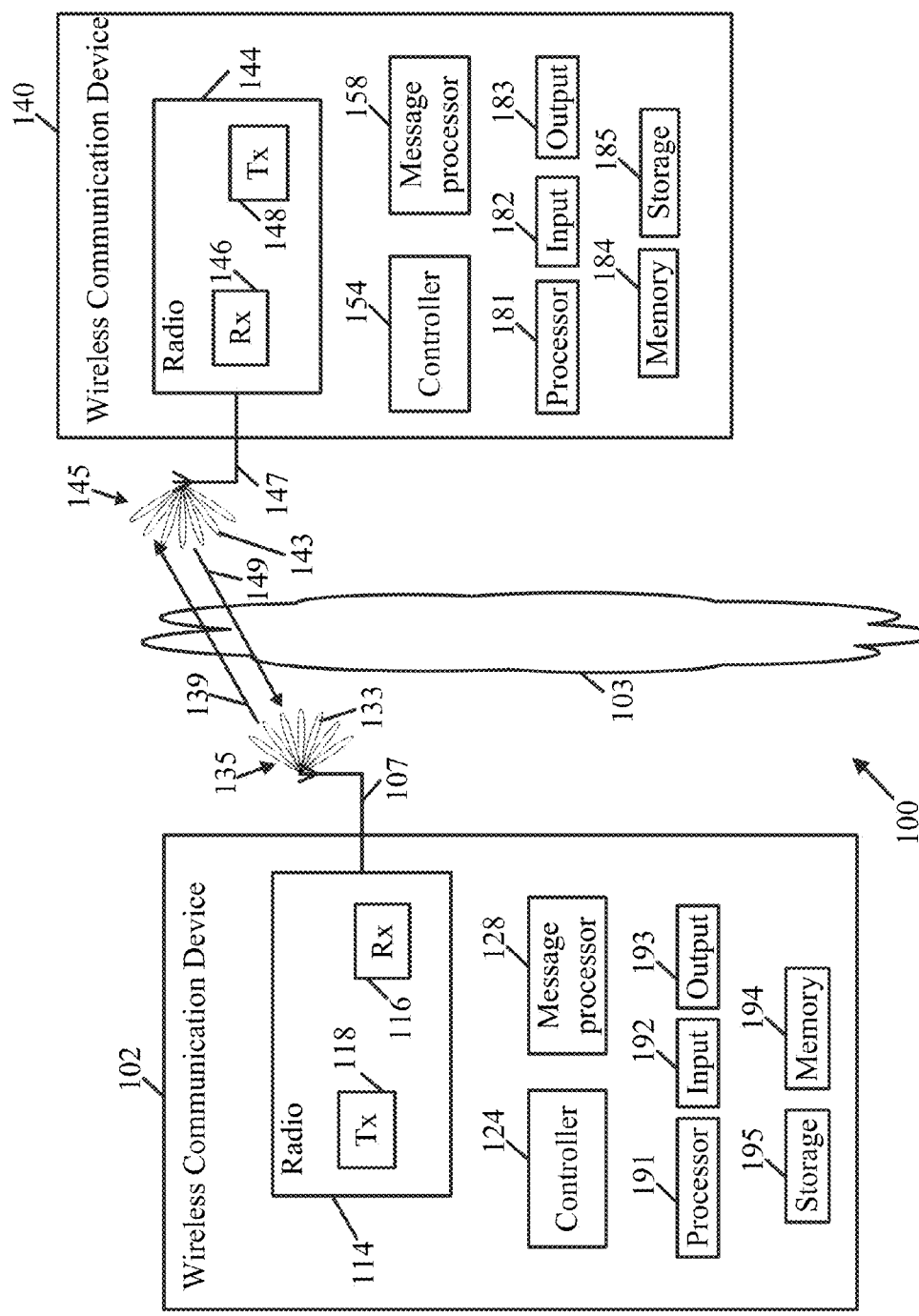
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY)*

Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless IAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (including "WiFi Peer-to-Peer (P2P) technical specification, version 1.5, Aug. 4, 2014") and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, a wireless communication device 115, and/or one more other devices.

In some demonstrative embodiments, devices 102, 115, and/or 140 may include a mobile device or a non-mobile, e.g., a static, device.

For example, devices 102, 115, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or devices 115 and/or 140 may include, for example, one or more of a processor 181, an input unit 182, an output unit 183, a memory unit 184, and/or a storage unit 185. Devices 102, 115, and/or 140 may optionally include other suitable hardware components and/or software components. In some demonstrative embodiments, some or all of the components of one or more of devices 102, 115, and/or 140 may be enclosed in a common housing or packaging, and may be interconnected or operably associated using one or more wired or wireless links. In other embodiments, components of one or more of devices 102, 115 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115, and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102, 115, and/or 140 may perform the functionality of one or more wireless stations, e.g., as described below.

In some demonstrative embodiments, devices 102, 115, and/or 140 may perform the functionality of one or more DMG stations.

In other embodiments, devices 102, 115, and/or 140 may perform the functionality of any other wireless device and/or station, e.g., a WLAN STA, a WiFi STA, and the like.

In some demonstrative embodiments, devices 102, 115, and/or 140 may include one or more radios including circuitry and/or logic to perform wireless communication between devices 102, 115, 140 and/or one or more other wireless communication devices. For example, device 102 may include a radio 114, and/or devices 115 and/or 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 and/or device 115 may include a single antenna 147. In another example, device 140 and/or device 115 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, antennas 107 and/or 147 may include a directional antenna, which may be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, e.g., via a direction 133, and/or device 140 may transmit a directional transmission 149 to device 102, e.g., via a direction 143.

In some demonstrative embodiments, device 102 may include a controller 124, and/or devices 140 and/or 115 may include a controller 154. Controllers 124 and/or 154 may be configured to perform one or more communications, may generate and/or communicate one or more messages and/or transmissions, and/or may perform one or more functionalities, operations and/or procedures between devices 102, 115, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102, 115, and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102, 115, and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

Some specifications may be configured to support communications over a single channel bandwidth (BW) of a wireless communication band, for example, a DMG band or any other band. For example, the *IEEE 802.11ad Specification* defines a 60 GHz system with a single channel bandwidth (BW) of 2.16 GHz, which is to be used by all Stations (STAs) for both transmission and reception.

In some demonstrative embodiments, devices 102, 115, and/or 140 may be configured to implement one or more mechanisms, which may, for example, enable to extend a single-channel BW scheme, e.g., a scheme in accordance with the *IEEE 802.11ad Specification* or any other scheme, for higher data rates and/or increased capabilities, e.g., as described below.

In some demonstrative embodiments, devices 102, 115, and/or 140 may be configured to implement one or more channel bonding mechanisms, which may, for example, support communication over bonded channels.

In some demonstrative embodiments, the channel bonding may include, for example, a mechanism and/or an operation whereby two or more channels can be combined, e.g., for a higher bandwidth of packet transmission, for example, to enable achieving higher data rates, for example, compared to transmissions over a non-bonded channel, e.g., a single channel.

In some demonstrative embodiments, devices 102, 115 and/or 140 may be configured to implement one or more channel bonding mechanisms, which may for example, support an increased channel bandwidth, for example, a channel BW of 4.32 GHz, a channel BW of 6.48 GHz, and/or any other additional or alternative channel BW.

Some specifications, e.g., the *IEEE* 802.11*ad*-2012 *Specification*, may be configured to support a Single User (SU) system, in which a Station (STA) cannot transmit frames to more than a single STA at a time. Such specifications may not be able, for example, to support transmission from a STA to multiple STAs, e.g., simultaneously.

In some demonstrative embodiments, devices 102, 140, and/or 115 may be configured to support simultaneous transmission from a STA, e.g., a STA implemented by device 102, to multiple STAs, e.g., including a STA implemented by device 140 and/or a STA implemented by device 115, for example, using a multi-user MIMO (MU-MIMO) scheme, e.g., a downlink (DL) MU-MIMO, and/or any other MU scheme.

In some demonstrative embodiments, devices 102, 115, and/or 140 may be configured to implement one or more Multi-User (MU) mechanisms. For example, devices 102, 115, and/or 140 may be configured to implement one or more MU mechanisms, which may be configured to enable MU communication.

In some demonstrative embodiments, devices 102, 140 and/or 115 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including devices 140, 115 and/or one or more other devices, e.g., as described below.

In some demonstrative embodiments, devices 102, 115 and/or 140 may be configured to implement any other additional or alternative MU mechanism, e.g., to communicate MU transmissions, and/or any other MIMO mechanism, e.g., to communicate MIMO transmissions.

In some demonstrative embodiments, devices 102, 115, and/or 140 may be configured to communicate over a Next Generation 60 GHz (NG60) network, an Extended DMG (EDMG) network, and/or any other network and/or any other frequency band. For example, devices 102, 115, and/or 140 may be configured to communicate DL MU-MIMO transmissions and/or use channel bonding, for example, for communicating over the NG60 and/or EDMG networks.

Figure 2:
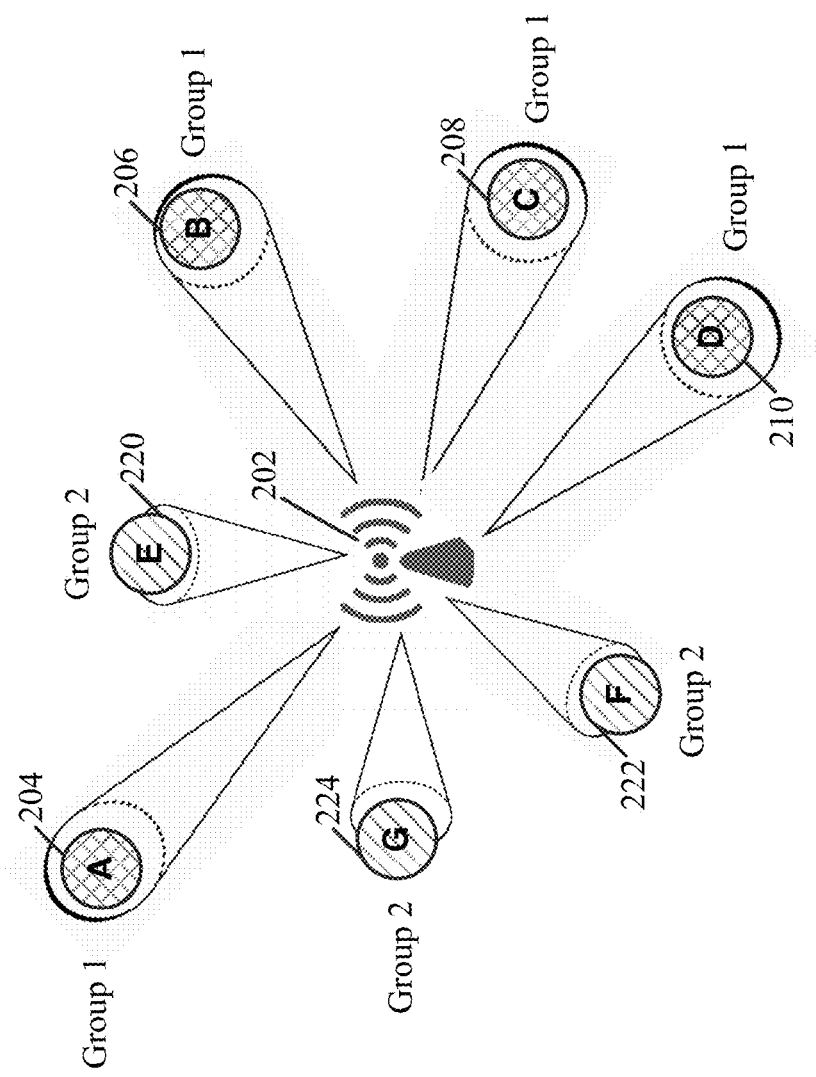
FIG. 2 is a schematic illustration of a Multi-User (MU) scheme including two groups of Stations (STAs), in accordance with some demonstrative embodiments.

FIG. 2 is a schematic illustration of a Multi-User (MU) scheme including two groups of Stations (STAs), in accordance with some demonstrative embodiments.

For example, as shown in FIG. 2, a STA 202 may be configured to communicate with a first group, denoted group 1, which may include four STAs, e.g., a STA A 204, a STA B 206, a STA C 208, and a STA D 210; and/or a second group, denoted group 2, which may include three STAs, e.g., a STA E 220, a STA F 222, and a STA G 224.

In one example, device 102 (FIG. 1) may perform the functionality of STA 202, device 115 (FIG. 1) may perform the functionality of one of STAs 204, 206, 208, 210, 220, 222, and/or 224, and/or device 140 (FIG. 1) may perform the functionality of another one of STAs 204, 206, 208, 210, 220, 222, and/or 224.

Referring back to FIG. 1, in some demonstrative embodiments, devices 102, 140 and/or 115 may be configured according to a communication scheme, which may include changes to an *IEEE* 802.11 *Specification*, e.g., the *IEEE* 802.11*ad*-2012 *Specification*, for example, at least in a Physical layer (PHY) and/or a Media Access Control (MAC) layer, for example, to support MU capabilities. For example, a PHY header, a Physical Layer Convergence Protocol (PLCP) Protocol Data Unit (PPDU) format and/or MU MIMO signaling may be configured to enable the MU communications, e.g., as described below.

In some demonstrative embodiments, devices 102, 140 and/or 115 may be configured according to a communication scheme, which include a Physical layer (PHY) and/or a Media Access Control (MAC) layer, for example, to support MU capabilities. For example, the communication scheme may include a PHY header, a Physical Layer Convergence Protocol (PLCP) Protocol Data Unit (PPDU) format and/or MU MIMO signaling, which may be configured to enable the MU communications, e.g., as described below.

In some demonstrative embodiments, the communication scheme may be based on, or may include, for example, changes to an *IEEE* 802.11 *Specification*, e.g., the *IEEE* 802.11*ad*-2012 *Specification*. In other embodiments, the communication scheme may be based on, or may include changes to any other Specification or protocol. In other embodiments, the communication scheme may include a new and/or dedicated scheme.

In some demonstrative embodiments, devices 102, 140 and/or 115 may be configured to utilize a PPDU structure, which may be configured, for example, at least for MU directional communication, for example, over a DMG band, e.g., as described below.

In some demonstrative embodiments, a PPDU structure may be configured in accordance with unique requirements for beamforming in a directional band, for example, in a DMG band, e.g., in a 60 Gigahertz (GHz) band.

In some demonstrative embodiments, devices 102, 115 and/or 140 may be configured to use a PPDU structure, for example, in accordance with an *IEEE* 802.11*ad Specification*, which may include optional Automatic Gain Control (AGC) and/or Training (TRN) fields, e.g., at the end of the PPDU.

Figure 3:
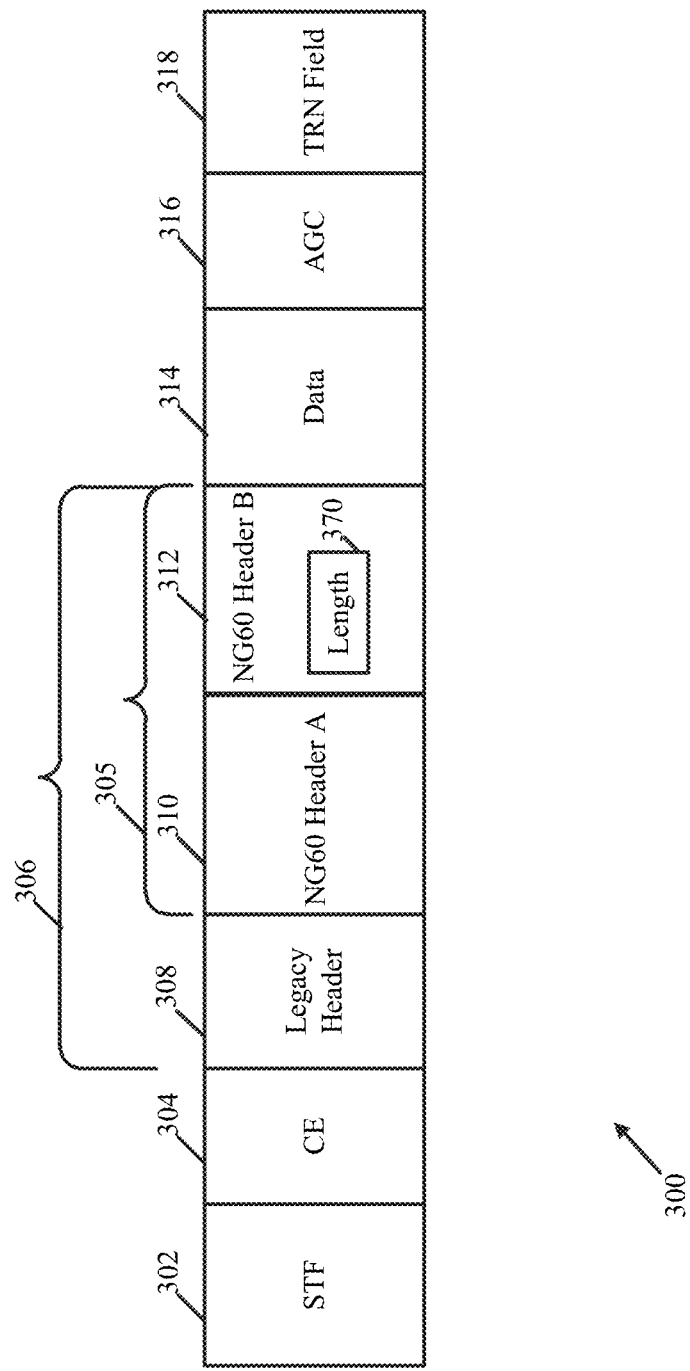
FIG. 3 is a schematic illustration of a Physical Layer Convergence Protocol (PLCP) Protocol Data Unit (PPDU) structure, in accordance with some demonstrative embodiments.

Reference is made to FIG. 3, which schematically illustrates a Physical Layer Convergence Protocol (PLCP) Protocol Data Unit (PPDU) structure 300, in accordance with some demonstrative embodiments.

In some demonstrative embodiments, PPDU structure 300 may be configured, for example, to support communication according to a MU MIMO configuration, for example, over a directional band, e.g., as described below.

In some demonstrative embodiments, PPDU structure 300 may be configured to support use of AGC and/or TRN fields, for example, for both transmit and receive beamforming, e.g., in the 60 GHz band. In one example, some frames, e.g., frames that do not require beamforming, may not carry the AGC and/or TRN fields, e.g., as described below.

In some demonstrative embodiments, the directional PPDU structure of FIG. 3 may be configured, for example, at least to support communication according to a MU MIMO configuration, e.g., as described below.

In some demonstrative embodiments, device 102 (FIG. 1), device 115 (FIG. 1), and/or device 140 (FIG. 1) may be configured to process transmission and/or reception of the PPDU structure 300. For example, device 102 (FIG. 1) may be configured to generate and transmit a frame, e.g., a MU PPDU, having the PPDU structure 300, and/or devices 115 and/or 140 (FIG. 1) may be configured to process reception of a frame, e.g., a MU PPDU, having the PPDU structure 300, e.g., as described below.

In some demonstrative embodiments, as shown in FIG. 3, PPDU 300 may include a Short Training Field (STF) 302, a channel estimation (CE) field 304, a header portion 306, a data portion 314, an Automatic Gain Control (AGC) field 316, and/or a Training (TRN) field 318.

In some demonstrative embodiments, header portion 306 may include a PHY header portion.

In some demonstrative embodiments, header portion 306 may include a PLCP header portion, e.g., of a PPDU including the fields of frame structure 300.

In some demonstrative embodiments, a header structure of header portion 306 may be configured to support NG60 and/or EDMG communication, and/or any other type and/or form of communication, e.g., as described below.

In some demonstrative embodiments, as shown in FIG. 3, header portion 306 may include a legacy header (L-Header) 308.

In some demonstrative embodiments, legacy header 308 may include a header, which may have a structure in accordance with a current, legacy and/or conventional header.

In some demonstrative embodiments, legacy header 308 may have a structure, which may be processed, decoded and/or demodulated by one or more legacy, existing and/or conventional, e.g., devices which may currently be in the market.

In some demonstrative embodiments, legacy header 308 may have a structure, which may be in accordance with a PHY header structure of an *IEEE* 802.11 *Specification*, for example, the *IEEE* 802.11*ad*-2012 *Specification*, and/or any other Specification, protocol or Standard.

In some demonstrative embodiments, legacy header 308 may include a Single Carrier (SC) header. In other embodiments, legacy header 308 may include an OFDM header, and/or any other header.

In some demonstrative embodiments, header portion 306 may be configured to include one or more new information headers, which may be included as part of a PLCP header of PPDU 300, e.g., as described below In some demonstrative embodiments, header portion 306 may be configured to include a non-legacy information header 305, which may be included as part of a PLCP header of PPDU 300, e.g., as described below In some demonstrative embodiments, non-legacy header 305 may include a first non-legacy header 310, denoted "NG60 Header A" or "EDMG Header A", e.g., as described below.

In some demonstrative embodiments, non-legacy header 305 may include a second non-legacy header 312, denoted "NG60 Header B" or "EDMG Header B".

In other embodiments, non-legacy headers 310 and 312 may be combined into a single header 305 and/or may be divided into more than two headers.

In some demonstrative embodiments, non-legacy header 312 may follow the non-legacy header 310.

In some demonstrative embodiments, non-legacy header 312 may immediately follow the non-legacy header 310.

In some demonstrative embodiments, the non-legacy header 312 may not immediately follow the non-legacy header 310.

For example, non-legacy header 305 may include one or more fields, for example, training fields, between non-legacy header 310 and non-legacy header 312.

For example, non-legacy header 305 may include one or more fields, for example, one or more STF fields and/or one or more CE fields between non-legacy header 310 and non-legacy header 312, e.g., as described below with reference to FIG. 5.

In some demonstrative embodiments, non-legacy headers 310 and 312 may differ from each other, for example, at least with respect to where in the PPDU structure 300 non-legacy headers 310 and/or 312 may be included; and/or with respect to the contents, functionality, intent, and/or purpose of non-legacy headers 310 and/or 312.

In some demonstrative embodiments, as shown in FIG. 3, non-legacy header 310 may be included, for example, immediately after the legacy header 308.

In some demonstrative embodiments, non-legacy header 310 may be configured, for example, to include information pertaining to, and/or to be used by, both single user (SU) transmissions of a SU PPDU, and MU transmissions of a MU PPDU, e.g., as described below.

In some demonstrative embodiments, non-legacy header 312 may be configured, for example, to include information pertaining to, and/or to be used by, MU transmissions, e.g., as described below. In one example, non-legacy header 312 may optionally be excluded from structure 300, for example, in a SU transmission.

In some demonstrative embodiments, non-legacy header 312 may be included, for example, on a per SS basis, e.g., as described below.

In some demonstrative embodiments, non-legacy header 310 may include, for example, information of a number of channels to be bonded, e.g., to transmit at least data portion 314; a length of the PPDU, e.g., a length of at least data portion 314 and/or one or more elements of frame 300; a Cyclic Prefix (CP) interval; a number of spatial streams, e.g., to transmit at least data portion 314 to one or more users; and/or any other additional or alternative information.

In some demonstrative embodiments, non-legacy header 312 may include, for example, MU-MIMO parameters, for example, information relating to Spatial Streams (SS), beamforming variables, training sequences, e.g., to be applied to at least data portion 314, and/or any other additional or alternative information.

In some demonstrative embodiments, at least some of the information of non-legacy header 312 may be included in non-legacy header 310, for example, in addition to or instead of including the information in non-legacy header 312.

In some demonstrative embodiments, data portion 314 may include a plurality of Spatial Streams (SSs) of MAC Protocol Data Units (MPDUs), e.g., Aggregate MPDUs (A-MPDUs), to a plurality of users, e.g., as described below.

For example, controller 124 (FIG. 1) may be configured to cause a wireless station, e.g., a wireless station implemented by device 102 (FIG. 1), to generate and process transmission of an MU PPDU, e.g., in accordance with the PPDU structure 300, to a plurality of users, e.g., a plurality of stations implemented by devices 140 (FIG. 1), 115 (FIG. 1) and/or one or more other devices. For example, the MU PPDU may include, e.g., in data portion 314, a plurality of spatial streams of MPDUs to the plurality of users, e.g., as described below.

In some demonstrative embodiments, header field 305 may include length information 370 to indicate one or more of lengths of one or more respective MPDUs of the plurality of MPDUs in data portion 314, e.g., as described below.

In one example, data portion 314 may include three SSs, e.g., to three users. According to this example, length information 370 may include a first length value to indicate a length of an MPDU of a first SS in data portion 314, a second length value to indicate a length of an MPDU of a second SS in data portion 314, and/or a third length value to indicate a length of an MPDU of a third SS in data portion 314, e.g., as described below.

Referring back to FIG. 1, in some demonstrative embodiments, devices 102, 115 and/or 140 may be configured to communicate MU transmissions, for example, such that, for example, transmission to each user in a MU transmission may end at substantially the same time, e.g., as described below.

In some demonstrative embodiments, configuring the transmission to each user to end at the same time may enable, for example, to keep the wireless medium busy, and/or prevent other STAs that are not in the MU group, which is to receive the MU transmission, from transmitting.

In some demonstrative embodiments, an MU PPDU format using MAC padding may not be suitable and/or efficient, e.g., for MU directional communication, e.g., over a DMG band, as discussed below.

Figure 4:
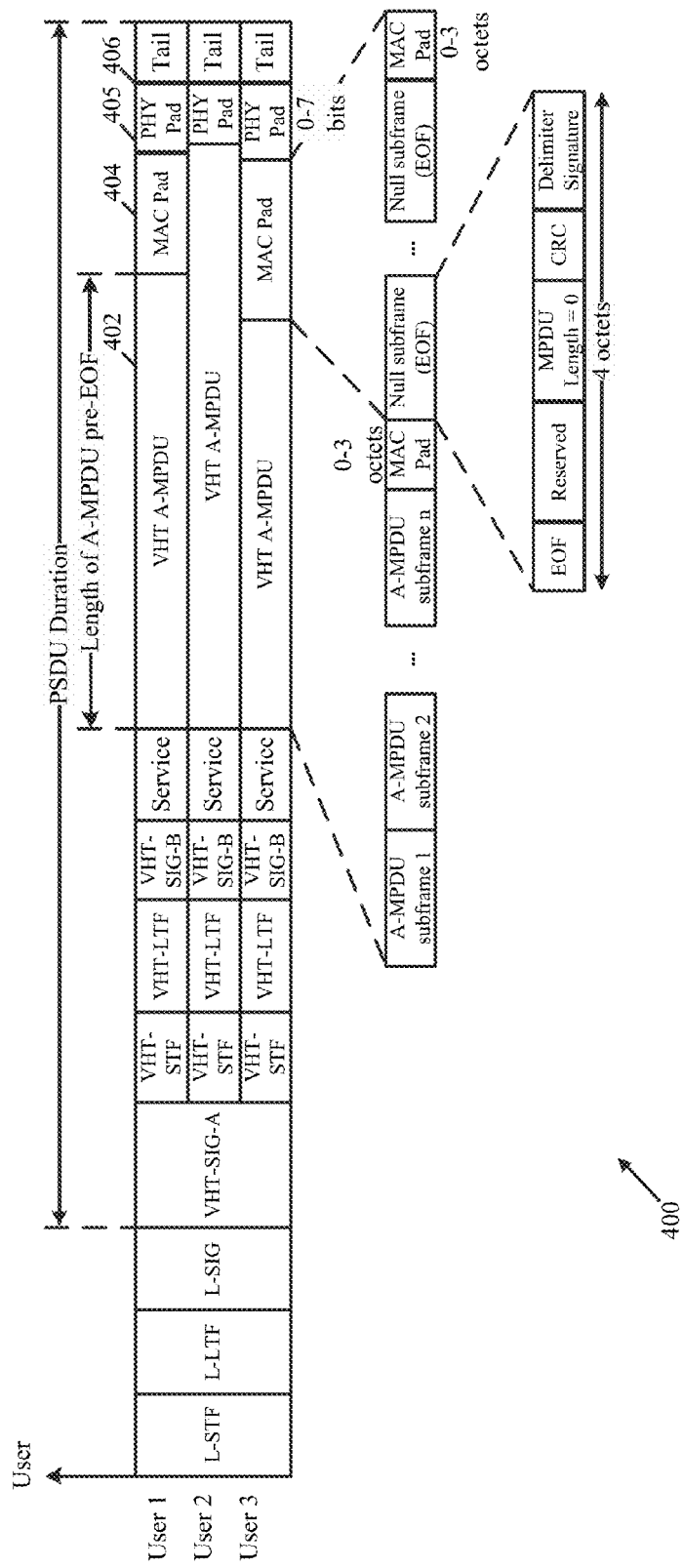
FIG. 4 is a schematic illustration of a MU PPDU structure using Media Access Control (MAC) padding.

FIG. 4 is a schematic illustration of a MU PPDU structure 400 using Media Access Control (MAC) padding, for example, for 5 GHz systems or other systems, e.g., in accordance with an *IEEE* 802.11*ac Specification*, for example, with respect to a group including three users.

As shown in FIG. 4, MAC padding 404 may be inserted after an Aggregate MAC Protocol Data Unit (A-MPDU) 402, for example, to ensure that the transmission to each user in the PPDU ends at the same time 406. As shown in FIG. 4, after the MAC padding 404, a very short PHY padding 405, e.g., a PHY padding of not more than 7 bits, can be added to the packet.

In some demonstrative embodiments, the MU PPDU structure 400 including the MAC padding 404 may not be suitable for use with respect to a PPDU structure including the AGC and/or TRN fields, e.g., PPDU structure 300 (FIG. 3) including AGC field 316 (FIG. 3) and/or TRN field 318 (FIG. 3).

For example, using the MAC padding 404 in the PPDU structure 400 may suffice, for example, since there is no PHY field (Tail is not present when LDPC is used) after the end of the Physical Layer Service Data Unit (PSDU). For example, as soon as a receiving STA receives the first MAC padding with an EOF field set to 1, the receiving STA may stop receiving and potentially turn off its receiver completely.

In contrast to the PPDU structure 400, a directional PPDU structure, e.g., PPDU structure 300 (FIG. 3), may include the AGC field 3176 (FIG. 3) and/or the TRN field 318 (FIG. 3) following a PSDU including data field 314 (FIG. 3).

In some demonstrative embodiments, the AGC field 316 (FIG. 3) and/or TRN field 318 (FIG. 3) may be used, for example, as part of a beamforming procedure, which may performed, for example, in order to enable a directional transmission of PPDU structure 300 (FIG. 3). Accordingly, MAC padding, e.g., according to the PPDU structure of FIG. 4, may lead a receiver STA to consume more power, for example, since the receiver STA would have to stay awake waiting for the AGC and TRN fields after the A-MPDU ends.

Referring back to FIG. 1, in some demonstrative embodiments, according to one approach ("Approach 1"), devices 102, 115 and/or 140 may be configured to communicate a MU transmission using the PPDU structure 300 (FIG. 3), for example, by adding PHY padding to the MU PPDU structure, e.g., as describe below.

In some demonstrative embodiments, the PHY padding may be configured, for example, to allow the construction of the MU PPDU, for example, such that all transmissions to each user addressed by the MU PPDU end at the same time, e.g., as described below.

In other embodiments, transmission of AGC field 316 (FIG. 3) and/or TRN field 318 may be avoided, e.g., prohibited, for example, when performing a MU MIMO transmission, e.g., as described below.

In some demonstrative embodiments, according to another approach ("Approach 2"), a device, e.g., device 102, may be prohibited to perform transmission of, or may be configured to avoid transmission of, the AGC field 316 (FIG. 3) and/or the TRN field 318 (FIG. 3), for example, when a MU PPDU is transmitted.

According to these embodiments, MAC padding may be used, for example, instead of PHY padding. In one example, a specification, e.g., an IEEE 802.11 ay Specification or any other specification, may be configured to prohibit transmission of the AGC field 316 (FIG. 3) and/or the TRN field 318 (FIG. 3), for example, when a MU PPDU is transmitted.

In some demonstrative embodiments, for example, if transmission of the AGC field 316 (FIG. 1) and/or TRN field 318 (FIG. 1) in the MU PPDU is to be allowed, e.g., according to Approach 1, a transmitter of a MU MIMO PPDU, e.g., device 102 (FIG. 1), may be configured to construct the MU PPDU, for example, such that all transmissions, e.g., to each individual STA in the MU MIMO group, may end at the same time, e.g., as described below.

In some demonstrative embodiments, for example, according to the Approach 1, a two pronged approach may be used, for example, to avoid the potential problems described above with respect to MAC padding, e.g., as described below.

In some demonstrative embodiments, the MU PPDU structure may be configured such that transmissions to each individual STA in the MU MIMO group may end at the same time, for example, by inclusion of a field in header portion 306 (FIG. 3), e.g., in header 312 (FIG. 3), for example, length information field 370 (FIG. 3) to indicate a length of the A-MPDU for a user, e.g., in octets.

In some demonstrative embodiments, the MU PPDU structure may be configured such that transmissions, e.g., to each individual STA in the MU MIMO group, may end at the same time, for example, by inclusion of a PHY padding following one or more MPDUs in the PHY PPDU structure 300 (FIG. 3), e.g., to align the end of the transmission to each user, as described below.

In some demonstrative embodiments, controller 124 may be configured to cause a wireless station, e.g., a STA implemented by device 102, to generate a MU PPDU, e.g., according to PPDU structure 30 (FIG. 3), including a header field, e.g., header field 305 (FIG. 3), and a plurality of MPDUs to a respective plurality of users, e.g., in data portion 314 (FIG. 3).

In some demonstrative embodiments, an MPDU of the plurality of MPDUs may include an A-MPDU, for example, including a plurality of A-MPDU subframes, e.g., as described below.

In some demonstrative embodiments, the header field may include an indication, e.g., in length field 370 (FIG. 3), of one or more lengths of respective ones of one or more of the plurality of MPDUs, e.g., as described above.

In some demonstrative embodiments, the header field may include an indication, e.g., in length field 370 (FIG. 3), of a plurality of lengths of respective ones of the plurality of MPDUs, e.g., as described above.

In some demonstrative embodiments, controller 124 may be configured to cause the wireless station to generate the MU PPDU such that one or more MPDUs of the plurality of MPDUs are followed by one or more respective PHY padding portions extending to an end of a longest MPDU of the plurality of MPDUs, e.g., as described below.

In some demonstrative embodiments, controller 124 may be configured to cause the wireless station to process transmission of the MU PPDU to the plurality of users over a wireless communication band, for example, a directional band, e.g., a DMG band, or any other band.

In some demonstrative embodiments, each MPDU of the plurality of MPDUs, except for the longest MPDU, may followed by a PHY padding portion extending to the end of the longest MPDU. According to these embodiments, all PSDUs, e.g., including the MPDUs and the PHY padding portions, may be extended to end at an end of the longest MPDU, e.g., as described below.

In some demonstrative embodiments, at least one first MPDU may have a first MPDU length, and at least one second MPDU may have a second MPDU length, e.g., different from the first MPDU length. According to these embodiments, the first MPDU may be followed by a first PHY padding portion having a first padding length, and the second MPDU followed by a second padding portion having a second padding length. For example, a sum of the first MPDU length and the first padding length may be equal to a sum of the second MPDU length and the second padding length.

In some demonstrative embodiments, the one or more PHY padding portions may include at least one dummy PHY data block, e.g., having a structure similar to data field 314 (FIG. 3).

In some demonstrative embodiments, the one or more PHY padding portions may include at least one dummy Training field, e.g., having a structure similar to TRN field 318 (FIG. 3).

In some demonstrative embodiments, controller 124 may be configured to cause the wireless station to generate the MU PPDU including at least one PHY field, for example, following a PSDU, e.g., as described below.

In some demonstrative embodiments, at least one PHY padding portion of the one or more PHY padding portions may be followed by at least one PHY field.

In some demonstrative embodiments, the at least one PHY field may include, for example, at least one AGC field and/or at least one TRN field, e.g., at least one AGC field 314 (FIG. 3), followed by at least TRN field 316 (FIG. 3).

In some demonstrative embodiments, each of the PHY padding portions may be followed by the at least one PHY field, e.g., the same PHY field.

In some demonstrative embodiments, controller 124 may be configured to cause the wireless station to generate the MU PPDU including the at least one PHY field, e.g., the same PHY field following the PHY padding portions, for example, after the longest MPDU.

In some demonstrative embodiments, controller 124 may be configured to cause the wireless station to generate the MU PPDU including an indication of the length of the longest MPDU.

In some demonstrative embodiments, a legacy header of the MU PPDU, e.g., legacy header 308 (FIG. 3), may include a length field. For example, controller 124 may cause the wireless station to set the length field of the legacy header 308 (FIG. 3) to indicate the length of at least the longest MPDU.

In some demonstrative embodiments, controller 154 may be configured to cause a wireless station, e.g., a wireless station implemented by device 140, to process reception of an MU PPDU ("the received MU PPDU") including a plurality of MPDUs to a plurality of users. For example, the received MU PPDU may include the MU PPDU transmitted by device 102.

In some demonstrative embodiments, controller 154 may be configured to cause the wireless station to process reception of an MPDU addressed to the wireless station, for example, based on a length of the MPDU indicated by the header field, e.g., based on a length indication in length field 370 (FIG. 3) corresponding to the MPDU addressed to the wireless station.

Figure 5:
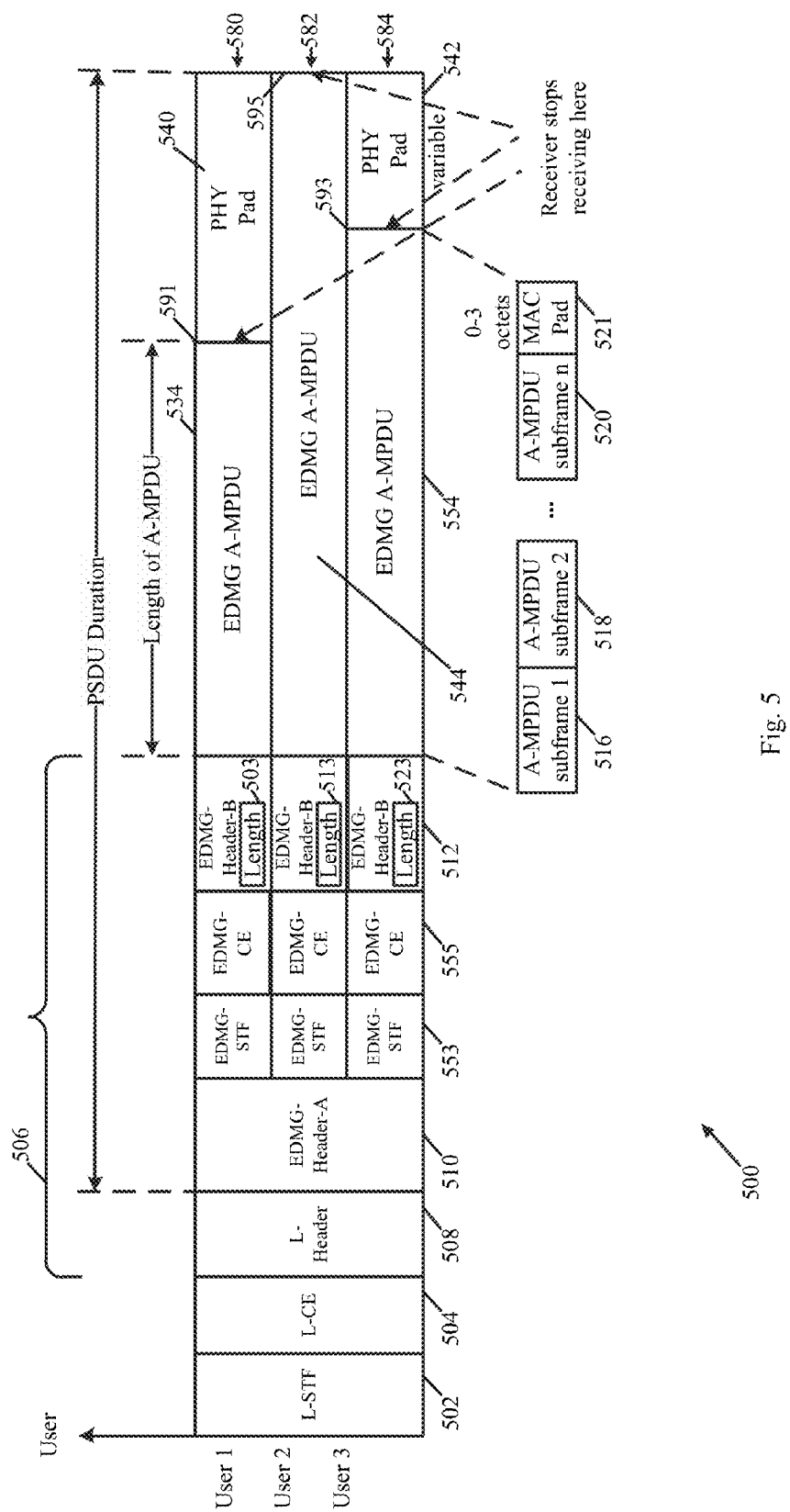
FIG. 5 is a schematic illustration of a MU PPDU structure, in accordance with some demonstrative embodiments.

Reference is made to FIG. 5, which schematically illustrates a MU PPDU structure 500, in accordance with some demonstrative embodiments.

In some demonstrative embodiments, device 102 (FIG. 1), device 115 (FIG. 1), and/or device 140 (FIG. 1) may be configured to process transmission and/or reception of the MU PPDU structure 500. For example, device 102 (FIG. 1) may be configured to generate and transmit a frame having the MU PPDU structure 500, for example, to a plurality of users, e.g., N>1 users, for example, of an MU group, e.g., including devices 115 and/or 140 (FIG. 1). For example, device 102 (FIG. 1) may transmit MU PPDU 500 over a directional band, e.g., over a DMG band. For example, devices 115 and/or 140 (FIG. 1) may be configured to process reception the MU PPDU structure 500, e.g., as described below. For example, as shown in FIG. 5, MU PPDU structure 500 may be transmitted to N=3 users.

In some demonstrative embodiments, MU PPDU 500 may include a legacy STF (L-STF) 502, a legacy CE (L-CE) field 504, and a header field 506, e.g., as described below. For example, L-STF 502 may include STF 302 (FIG. 3), L-CE 504 may include CE field 304 (FIG. 3), and/or header field 506 may include header 306 (FIG. 3).

In some demonstrative embodiments, header field 506 may include a legacy header (L-Header) 508, a first non-legacy header 510, and a second non-legacy header 512. For example, legacy header 508 may include legacy header 308 (FIG. 3), non-legacy header 510 may include non-legacy header 310 (FIG. 3), and/or non-legacy header 512 may include non-legacy header 312 (FIG. 3).

In some demonstrative embodiments, header field 506 may also include a non-legacy STF 553, e.g., an EDMG-STF or NG60-STF; and/or a non-legacy CE field 555, e.g., an EDMG-CE or NG60 CE.

In some demonstrative embodiments, MU PPDU 500 may include a PHY Service Data Unit (PSDU) including a plurality of Spatial Streams (SSs) to the plurality of users, e.g., as described below.

For example, as shown in FIG. 5, MU PPDU 500 may include an SS 580 to a first user ("user 1"), an SS 582 to a second user ("user 2"), and/or an SS 584 to a third user ("user 3"). In other embodiments, MU PPDU 500 may include any other number of SS to any other number of users.

In some demonstrative embodiments, SS 580 may include, for example, an A-MPDU 534, e.g., an EDMG A-MPDU or an NG60 A-MPDU; SS 582 may include, for example, an A-MPDU 544, e.g., an EDMG A-MPDU or an NG60 A-MPDU; and/or SS 584 may include, for example, an A-MPDU 554, e.g., an EDMG A-MPDU or an NG60 A-MPDU.

In some demonstrative embodiments, as shown in FIG. 5, A-MPDU 534, A-MPDU 544, and/or A-MPDU 554 may include a plurality of A-MPDU subframes, e.g., including A-MPDU subframes 516, 518, and/or 520.

In some demonstrative embodiments, as shown in FIG. 5, A-MPDU 534, A-MPDU 544, and/or A-MPDU 554 may optionally include a MAC padding portion 521.

In some demonstrative embodiments, MU PPDU 500 may be generated and/or transmitted by a STA implemented by device 102 (FIG. 1), a STA implemented by device 140 (FIG. 1) may perform the functionality of a user of users 1, 2, and/or 3, and/or STA implemented by device 115 (FIG. 1) may perform the functionality of another one of users 1, 2 and/or 3.

In some demonstrative embodiments, as shown in FIG. 5, the same legacy header 508 may be provided to the plurality of users of the MU transmission.

In some demonstrative embodiments, non-legacy header 510 may include information of a number of channels to be bonded, e.g., to communicate SSs 580, 582, and/or 584; a length of the MU PPDU 500; a Cyclic Prefix (CP) interval; a number of spatial streams, e.g., to transmit at least SSs 580, 582, and/or 584; and/or any other additional or alternative information.

In some demonstrative embodiments, field 553, field 555, and/or non-legacy header 512 may include information, for example, on a per SS basis, e.g., as described below.

In some demonstrative embodiments, as shown in FIG. 5, non-legacy STF 553, non-legacy CE field 555 and/or non-legacy header field 512 may include information corresponding to the plurality of spatial streams. For example, non-legacy STF 553 may indicate first STF information corresponding to SS 580, second STF information corresponding to SS 582, and/or third STF information corresponding to SS 584; non-legacy CE field 555 may indicate first CE information corresponding to SS 580, second CE information corresponding to SS 582, and/or third CE information corresponding to SS 584; and/or non-legacy header 512 may indicate first parameters corresponding to SS 580, second parameters corresponding to SS 582, and/or third parameters corresponding to SS 584, e.g., as described below.

In some demonstrative embodiments, non-legacy header 512 may include, for example, MU-MIMO parameters, for example, spatial streams, beamforming variables, training sequences, and the like.

For example, as shown in FIG. 5, non-legacy header 512 may indicate first MU-MIMO parameters corresponding to SS 580, second MU-MIMO parameters corresponding to SS 582, and/or third MU-MIMO parameters corresponding to SS 584.

In some demonstrative embodiments, a MU PPDU, e.g., MU PPDU 500, may be configured not to include one or more PHY fields, e.g., one or more AGC and/or TRN fields, following the PSDU, e.g., as shown in FIG. 5.

In other embodiments, a MU PPDU may be configured to include one or more PHY fields, e.g., one or more AGC and/or TRN fields, following the PSDU, e.g., as described below with reference to FIG. 6.

In some demonstrative embodiments, MU PPDU structure 500 may include a field ("indication field"), which may be configured to indicate to a receiver of the MU PPDU 500 an end time of an A-MPDU addressed to the receiver, e.g., as described below.

In some demonstrative embodiments, header field 505 may include the indication field, e.g., as described below.

In some demonstrative embodiments, non-legacy header 512 may include the indication field, e.g., as described below. For example, the indication field may be configured to enable a receiver, e.g., each receiver, addressed by the MU PPDU 500, e.g., device 115 and/or device 140 (FIG. 1), to know the end of the A-MPDU to be received by the receiver.

In some demonstrative embodiments, non-legacy heard field 512 may include at least one length field, which may include a first length indication or field 503 to indicate a length of an A-MPDU, e.g., A-MPDU 534, of the SS 580; a second length indication or field 513 to indicate a length of an A-MPDU, e.g., A-MPDU 544, of the SS 582; and/or a third length indication or field 523 to indicate a length of an A-MPDU, e.g., A-MPDU 554, of the SS 584.

In some demonstrative embodiments, A-MPDU transmissions to different users may have different lengths. For example, as shown in FIG. 5, A-MPDU 534 may have a first length, A-MPDU 554 may have a second length, e.g., longer than the first length, and A-MPDU 544 may have a third length, e.g., longer than the second length.

In some demonstrative embodiments, a transmitter of MU PPDU 500, e.g., device 102 (FIG. 1) may be configured to pad the PSDU, for example, such that all PPDUs in the MU PPDU end at the same time, e.g., as described below.

In some demonstrative embodiments, controller 124 (FIG. 1) may be configured to cause the wireless station implemented by device 102 (FIG. 1) to add PHY padding portions following A-MPDUs of MU PPDU 500, e.g., to extend the PSDU to an end of a longest MPDU of MU PPDU 500, e.g., to an end of A-MPDU 544.

For example, as shown in FIG. 5, controller 124 (FIG. 1) may be configured to cause the wireless station implemented by device 102 (FIG. 1) to add a PHY padding portion 540 following A-MPDU 534, and/or a PHY padding portion 542 following A-MPDU 554.

For example, as shown in FIG. 5, PHY padding portion 540 and PHY padding portion 542 may both extend until an end of A-MPDU 544.

In some demonstrative embodiments, as shown in FIG. 5, the amount of PHY padding may be variable, for example, if the length of each A-MPDU to each user is different.

In some demonstrative embodiments, the length of PHY padding portion 540 may be determined, for example, based on the length A-MPDU 534 and the length of longest MPDU in MU PPDU 500, e.g., the length of A-MPDU 544; and/or the length of PHY padding portion 542 may be determined, for example, based on the length A-MPDU 554 and the length of longest MPDU in MU PPDU 500, e.g., the length of A-MPDU 544.

For example, the sum of the length of A-MPDU 534 and the length of PHY padding portion 540 may be equal to the length of A-MPDU 544; and/or the sum of the length of A-MPDU 554 and the length of PHY padding portion 542 may be equal to the length of A-MPDU 544.

In some demonstrative embodiments, the transmitter of MU PPDU 500, e.g., device 102 (FIG. 1) may be configured to include PHY padding portions 540 and/or 542 at the end of the PPDU. The PHY padding portions 540 and/or 542 may be inserted, for example, directly by a PHY of the transmitter of MU PPDU 500, e.g., without involvement from the MAC.

In some demonstrative embodiments, the transmitter of the MU PPDU, e.g., device 102 (FIG. 1), may include enough PHY padding in MU PPDU 500, for example, until the end of the PPDU, e.g., as may be indicated in the L-Header field 508.

In some demonstrative embodiments, the PHY of the transmitter of MU PPDU 500 may be configured to ensure that the transmission to each user ends at the same time, for example, while using a reduced amount, e.g., minimal amount, of padding across users. In one example, this may be an implementation requirement for the PHY.

In some demonstrative embodiments, the transmitter of MU PPDU 500, e.g., device 102 (FIG. 1), may be configured to include any suitable content in PHY padding portions 540 and/or 542. In one example, PHY padding portions may include one or more PHY data blocks, e.g., dummy PHY data blocks. In another example, PHY padding portions may include one or more TRN fields, e.g., dummy TRN fields. The PHY may have, for example, the capability to transmit both types of content, and therefore both implementations may be simple.

In some demonstrative embodiments, from the perspective of the transmitter of MU PPDU 500, e.g., device 102 (FIG. 1), whether AGC and TRN fields are included or not in the frame, the transmitter may be allowed to pad the PSDU, e.g., such that all PPDUs in the MU PPDU end at the same time.

In some demonstrative embodiments, a receiver of the MU PPDU of FIG. 5 ("the receiver STA") may be able to use the indication field corresponding to a SS addressed to the receiver STA to determine, e.g., exactly, when the A-MPDU, which is to be received by the receiver STA, is to end, and when one or more next PHY fields, e.g., if present, AGC and/or TRN fields, may start.

In some demonstrative embodiments, controller 154 (FIG. 1) may be configured to process a length field, e.g., length field 513, corresponding to an SS, e.g., SS 580, addressed to the wireless station implemented by device 140 (FIG. 1). Controller 154 may be configured to determine, based on the length field, when an A-MPDU, e.g., A-MPDU 534, which is to be received by the wireless station, is to end.

In some demonstrative embodiments, e.g., as shown in FIG. 5, the MU PPDU may not include AGC and/or TRN fields, for example, after the A-MPDU ends. According to these embodiments, the receiver STA may know if the AGC and/or TRN fields are not included, e.g., based on the legacy header. In such case, the receiver STA may stop reception, e.g., and even turn off its receiver, for example, without any negative implications, e.g., since all elements of the frame have already been received.

For example, as shown in FIG. 5, a STA addressed by SS 580, e.g., a STA implemented by device 140 (FIG. 1), may determine an end time 591 of A-MPDU 534, e.g., based on length field 503, and may stop reception, or even power down of power off a receiver of the STA addressed by SS 580, e.g., until at least an end of MU PPDU 500.

For example, as shown in FIG. 5, a STA addressed by SS 584, e.g., a STA implemented by device 115 (FIG. 1), may determine an end time 593 of A-MPDU 554, e.g., based on length field 523, and may stop reception, or even power down of power off a receiver of the STA addressed by SS 584, e.g., until at least an end of MU PPDU 500.

For example, as shown in FIG. 5, a STA addressed by SS 582 may determine an end time 595 of A-MPDU 544, e.g., based on length field 513.

In some demonstrative embodiments, from the receiver perspective, e.g., device 115 and/or 140 (FIG. 1), the content of the PHY padding portions 540 and/or 542 may be irrelevant, for example, since the receiver may determine the end of the PPDU, and may be able to stop processing reception of the MU PPDU, e.g., as shown in FIG. 5.

Figure 6:
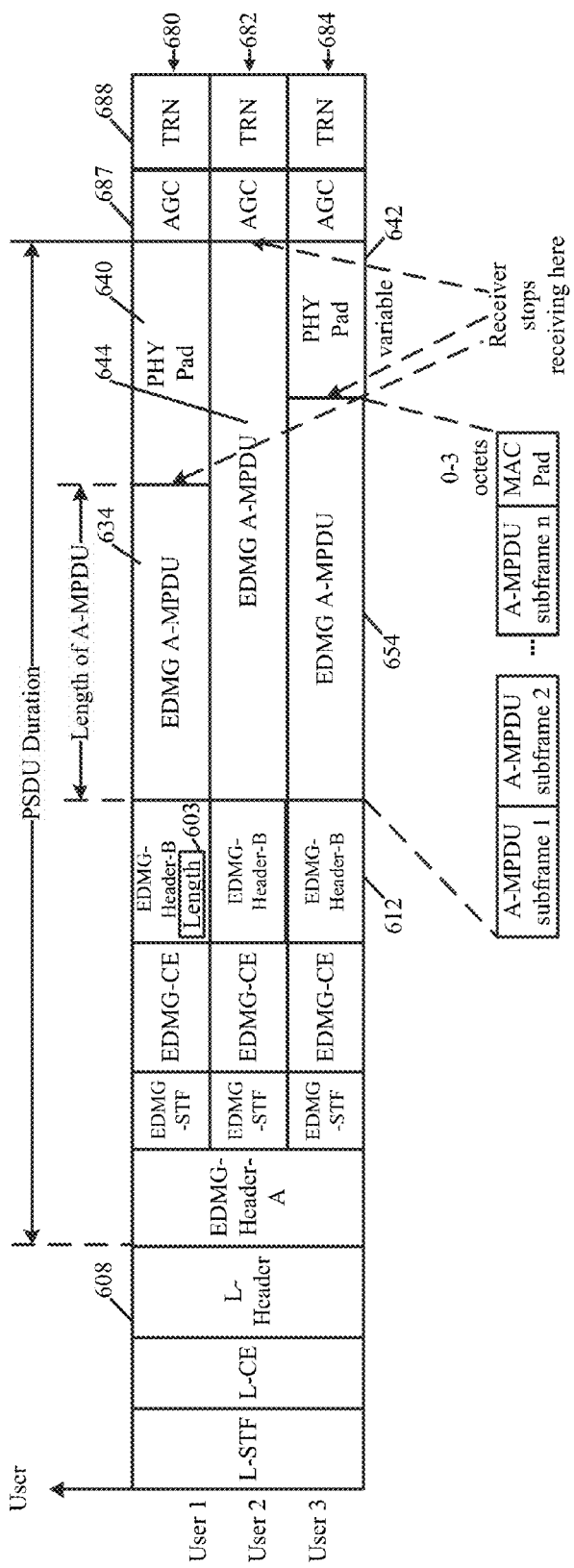
FIG. 6 is a schematic illustration of a MU PPDU structure, in accordance with some demonstrative embodiments.

Reference is made to FIG. 6, which schematically illustrates a MU PPDU structure 600, in accordance with some demonstrative embodiments.

In some demonstrative embodiments, device 102 (FIG. 1), device 115 (FIG. 1), and/or device 140 (FIG. 1) may be configured to process transmission and/or reception of the MU PPDU structure 600. For example, device 102 (FIG. 1) may be configured to generate and transmit a frame having the MU PPDU structure 600, for example, to a plurality of users, e.g., N>1 users, for example, of an MU group, e.g., including devices 115 and/or 140 (FIG. 1). For example, device 102 (FIG. 1) may transmit MU PPDU 600 over a directional band, e.g., over a DMG band. For example, devices 115 and/or 140 (FIG. 1) may be configured to process reception the MU PPDU structure 600, e.g., as described below. For example, as shown in FIG. 6, MU PPDU structure 600 may be transmitted to N=3 users.

In some demonstrative embodiments, MU PPDU 600 may include a PSDU including a plurality of SSs to the plurality of users, e.g., as described below.

For example, as shown in FIG. 6, MU PPDU 600 may include an SS 680 to a first user ("user 1"), an SS 682 to a second user ("user 2"), and/or an SS 684 to a third user ("user 3"). In other embodiments, MU PPDU 600 may include any other number of SS to any other number of users.

In some demonstrative embodiments, SS 680 may include, for example, an A-MPDU 634, e.g., an EDMG A-MPDU or an NG60 A-MPDU; SS 682 may include, for example, an A-MPDU 644, e.g., an EDMG A-MPDU or an NG60 A-MPDU; and/or SS 684 may include, for example, an A-MPDU 654, e.g., an EDMG A-MPDU or an NG60 A-MPDU.

In some demonstrative embodiments, MU PPDU 600 may include a PHY padding portion 640 following A-MPDU 634, and/or a PHY padding portion 642 following A-MPDU 654. For example, PHY padding portions 640 and/or 642 may extended to an end of A-MPDU 644, e.g., as described above.

In some demonstrative embodiments, MU MIMO PPDU 600 may be configured to include AGC and/or TRN fields, e.g., following the longest A-MPDU, and/or the PHY padding portions.

For example, as shown in FIG. 6, SS 680 may include at least one AGC field 687 and/or at least one TRN field 688, e.g., following padding portion 640; SS 682 may include the AGC field 687 and/or a TRN field 688, e.g., following A-MPDU 644; and/or SS 684 may include the AGC field 687 and/or TRN field 688, e.g., following padding portion 642.

In some demonstrative embodiments, the same AGC field 687 and/or TRN field 688 may be included in each of SSs 680, 682, and 684.

In other embodiments, any other configuration and/or arrangement of AGC and/or TRN fields may be used with respect to SS 680, SS 682 and/or SS 684.

In some demonstrative embodiments, as shown in FIG. 6, MU PPDU 600 may include the AGC field 687 and/or the TRN field 688, for example, after the longest A-MPDU ends, e.g., at the end of A-MPDU 644.

In some demonstrative embodiments, the presence of the AGC field 687 and/or the TRN field 688 may be signaled in a legacy header field, e.g., a legacy header 608, for example, in compliance with an *IEEE* 802.11*ad Specification*.

In some demonstrative embodiments, the presence of the AGC field 687 and/or the TRN field 688 may be signaled in an EDMG Header-A.

In some demonstrative embodiments, a receiver of the MU PPDU 600 may start receiving the AGC and/or TRN fields, e.g., immediately after the end of the longest A-MPDU.

For example, controller 154 (FIG. 1) may be configured to cause the wireless station implemented by device 140 (FIG. 1) to process reception of MU PPDU 600 including a SS, e.g., SS 680, addressed to the wireless station. Controller 154 (FIG. 1) may be configured to determine the length of A-MPDU 634, for example, based on a length field 603, for example, in a non-legacy header 612 of MU PPDU 600, e.g., as described above. Controller 154 (FIG. 1) may be configured to determine a time to receive AGC field 687 and/or TRN field 688, for example, based on the length field in legacy header 608.

In some demonstrative embodiments, according to Approach 2, transmission of the AGC and TRN fields may be prohibited in MU PPDUs.

In some demonstrative embodiments, prohibiting the transmission of AGC and/or TRN fields in MU PPDUs may, for example, avoid changes to the PPDU structure. For example, the MAC may be responsible for all padding, e.g., without requiring PHY changes. Therefore, absent any PPDU structure changes at the PHY, it may be advantageous to prohibit AGC and/or TRN field transmission when performing a MU MIMO PPDU transmission.

Figure 7:
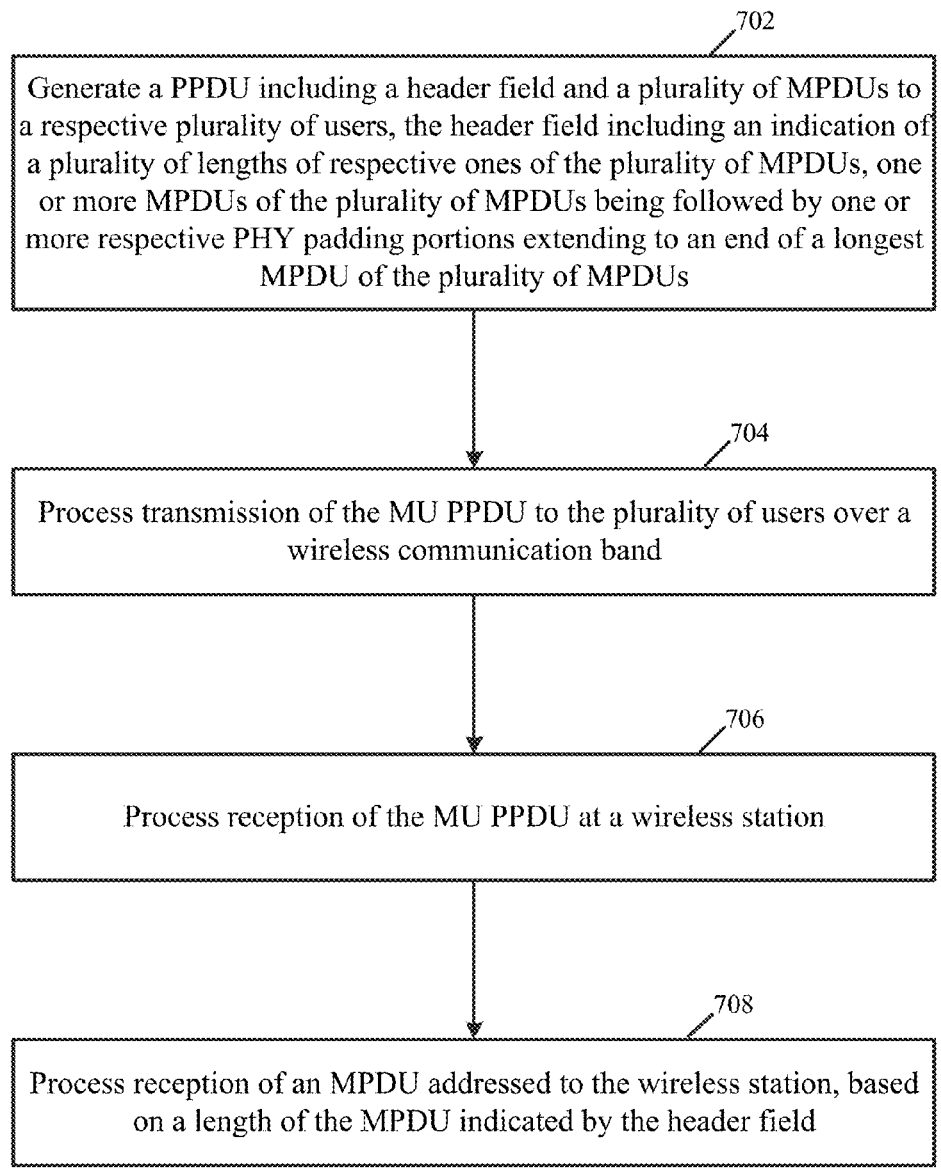
FIG. 7 is a schematic flow-chart illustration of a method of multi-user wireless communication, in accordance with some demonstrative embodiments.

Reference is made to FIG. 7, which schematically illustrates a method of MU wireless communication, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), device 115 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include generating a PPDU including a header field and a plurality of MPDUs to a respective plurality of users, the header field including an indication of a plurality of lengths of respective ones of the plurality of MPDUs, one or more MPDUs of the plurality of MPDUs being followed by one or more respective PHY padding portions extending to an end of a longest MPDU of the plurality of MPDUs. For example, controller 124 (FIG. 1) may cause message processor 128 (FIG. 1) to generate MU PPDU 500 (FIG. 5) including header field 512 (FIG. 5), which may include length fields 503, 513, and/or 523 (FIG. 5), to indicate respective lengths of A-MPDUs 534, 544 and/or 544 (FIG. 5), e.g., as described above. For example, controller 124 (FIG. 1) may cause message processor 128 (FIG. 1) to include in MU PPDU 500 (FIG. 5) the PHY padding portion 540 (FIG. 5), e.g., following A-MPDU 534 (FIG. 5), and/or the PHY padding portion 542 (FIG. 5), e.g., following A-MPDU 544 (FIG. 5), as described above.

As indicated at block 704, the method may include processing transmission of the MU PPDU to the plurality of users over a wireless communication band. For example, controller 124 (FIG. 1) may cause message processor 128 (FIG. 1) and/or radio 114 (FIG. 1) to process transmission of PPDU 500 (FIG. 5) to the plurality of users, e.g., including devices 115 and/or 140 (FIG. 1), via a wireless communication band, for example, a DMG band, e.g., as described above.

As indicated at bock 706, the method may include processing reception of the MU PPDU at a wireless station. For example, controller 154 (FIG. 1) may cause message processor 158 (FIG. 1) and/or radio 144 (FIG. 1) to process reception of MU PPDU 500 (FIG. 5), e.g., as described above.

As indicated at block 708, the method may include processing reception of an MPDU addressed to the wireless station, based at least on a length of the MPDU indicated by the header field. For example, controller 154 (FIG. 1) may cause message processor 158 (FIG. 1) and/or radio 144 (FIG. 1) to process reception of a SS addressed to the STA implemented by device 140 (FIG. 1), e.g., SS 580, 582, or 584 (FIG. 5), for example, based at least on a length of the MPDU indicated by the header field 512 (FIG. 5), e.g., as described above.

Figure 8:
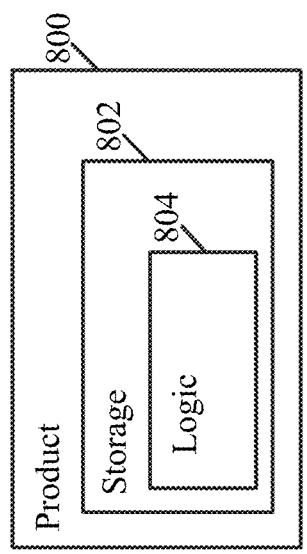
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of devices 102, 115, and/or 140 (FIG. 1), transmitters 118 and/or 148 (FIG. 1), receivers 116 and/or 146 (FIG. 1), controllers 124 and/or 154 (FIG. 1), and/or message processors 128 (FIG. 1) and/or 158 (FIG. 1), and/or to perform one or more operations and/or functionalities, for example, one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to generate a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and process transmission of the MU PPDU to the plurality of users over a wireless communication band.

Example 2 includes the subject matter of Example 1, and optionally, wherein each MPDU of the plurality of MPDUs, except for the longest MPDU, is followed by a PHY padding portion extending to the end of the longest MPDU.

Example 3 includes the subject matter of Example 1 or 2, and optionally, wherein at least one PHY padding portion of the one or more PHY padding portions is followed by at least one PHY field.

Example 4 includes the subject matter of Example 3, and optionally, wherein the longest MPDU is followed by the at least one PHY field.

Example 5 includes the subject matter of Example 3 or 4, and optionally, wherein each of the PHY padding portions is followed by the at least one PHY field.

Example 6 includes the subject matter of any one of Examples 3-5, and optionally, wherein the at least one PHY field comprises at least one field selected from the group consisting of an Automatic Gain Control (AGC) field, and a Training (TRN) field.

Example 7 includes the subject matter of any one of Examples 1-6, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 8 includes the subject matter of any one of Examples 1-7, and optionally, wherein the MU PPDU comprises a legacy header field followed by at least one non-legacy header field, the non-legacy header field comprising the indication of the plurality of lengths.

Example 9 includes the subject matter of Example 8, and optionally, wherein the legacy header comprises a length field to indicate a length of at least the longest MPDU.

Example 10 includes the subject matter of any one of Examples 1-9, and optionally, wherein the one or more PHY padding portions comprise at least one dummy PHY data block.

Example 11 includes the subject matter of any one of Examples 1-10, and optionally, wherein the one or more PHY padding portions comprise at least one dummy Training field.

Example 12 includes the subject matter of any one of Examples 1-11, and optionally, wherein an MPDU of the plurality of MPDUs comprises an Aggregate MPDU (A-MPDU) comprising a plurality of A-MPDU subframes.

Example 13 includes the subject matter of any one of Examples 1-12, and optionally, wherein the wireless communication band is a Directional Multi-Gigabit (DMG) band.

Example 14 includes the subject matter of any one of Examples 1-13, and optionally, wherein the wireless station is a Directional Multi-Gigabit (DMG) Station (STA).

Example 15 includes the subject matter of any one of Examples 1-14, and optionally, comprising a transmitter to transmit the MU PPDU.

Example 16 includes the subject matter of any one of Examples 1-15, and optionally, comprising one or more directional antennas, a memory, and a processor.

Example 17 includes an apparatus comprising circuitry configured to cause a wireless station to process reception of a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and process reception of an MPDU addressed to the wireless station, based on a length of the MPDU indicated by the header field.

Example 18 includes the subject matter of Example 17, and optionally, wherein each MPDU of the plurality of MPDUs, except for the longest MPDU, is followed by a PHY padding portion extending to the end of the longest MPDU.

Example 19 includes the subject matter of Example 17 or 18, and optionally, configured to cause the wireless station to process at least one PHY field after a PHY padding portion following the MPDU.

Example 20 includes the subject matter of Example 19, and optionally, wherein the longest MPDU is followed by the at least one PHY field.

Example 21 includes the subject matter of Example 19 or 20, and optionally, wherein each of the PHY padding portions is followed by the at least one PHY field.

Example 22 includes the subject matter of any one of Examples 19-21, and optionally, wherein the at least one PHY field comprises at least one field selected from the group consisting of an Automatic Gain Control (AGC) field, and a Training (TRN) field.

Example 23 includes the subject matter of any one of Examples 17-22, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 24 includes the subject matter of any one of Examples 17-23, and optionally, wherein the MU PPDU comprises a legacy header field followed by at least one non-legacy header field, the non-legacy header field comprising the indication of the plurality of lengths.

Example 25 includes the subject matter of Example 24, and optionally, wherein the legacy header comprises a length field to indicate a length of at least the longest MPDU.

Example 26 includes the subject matter of any one of Examples 17-25, and optionally, wherein the one or more PHY padding portions comprise at least one dummy PHY data block.

Example 27 includes the subject matter of any one of Examples 17-26, and optionally, wherein the one or more PHY padding portions comprise at least one dummy Training field.

Example 28 includes the subject matter of any one of Examples 17-27, and optionally, wherein the MPDU addressed to the wireless station comprises an Aggregate MPDU (A-MPDU) comprising a plurality of A-MPDU subframes.

Example 29 includes the subject matter of any one of Examples 17-28, and optionally, configured to cause the wireless station to process reception of the MU PPDU over a Directional Multi-Gigabit (DMG) band.

Example 30 includes the subject matter of any one of Examples 17-29, and optionally, wherein the wireless station is a Directional Multi-Gigabit (DMG) Station (STA).

Example 31 includes the subject matter of any one of Examples 17-30, and optionally, comprising a receiver to receive the MU PPDU.

Example 32 includes the subject matter of any one of Examples 17-31, and optionally, comprising one or more directional antennas, a memory, and a processor.

Example 33 includes a method to be performed at a wireless station, the method comprising generating a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and transmitting the MU PPDU to the plurality of users over a wireless communication band.

Example 34 includes the subject matter of Example 33, and optionally, wherein each MPDU of the plurality of MPDUs, except for the longest MPDU, is followed by a PHY padding portion extending to the end of the longest MPDU.

Example 35 includes the subject matter of Example 33 or 34, and optionally, wherein at least one PHY padding portion of the one or more PHY padding portions is followed by at least one PHY field.

Example 36 includes the subject matter of Example 35, and optionally, wherein the longest MPDU is followed by the at least one PHY field.

Example 37 includes the subject matter of Example 35 or 36, and optionally, wherein each of the PHY padding portions is followed by the at least one PHY field.

Example 38 includes the subject matter of any one of Examples 35-37, and optionally, wherein the at least one PHY field comprises at least one field selected from the group consisting of an Automatic Gain Control (AGC) field, and a Training (TRN) field.

Example 39 includes the subject matter of any one of Examples 33-38, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 40 includes the subject matter of any one of Examples 33-39, and optionally, wherein the MU PPDU comprises a legacy header field followed by at least one non-legacy header field, the non-legacy header field comprising the indication of the plurality of lengths.

Example 41 includes the subject matter of Example 40, and optionally, wherein the legacy header comprises a length field to indicate a length of at least the longest MPDU.

Example 42 includes the subject matter of any one of Examples 33-41, and optionally, wherein the one or more PHY padding portions comprise at least one dummy PHY data block.

Example 43 includes the subject matter of any one of Examples 33-42, and optionally, wherein the one or more PHY padding portions comprise at least one dummy Training field.

Example 44 includes the subject matter of any one of Examples 33-43, and optionally, wherein an MPDU of the plurality of MPDUs comprises an Aggregate MPDU (A-MPDU) comprising a plurality of A-MPDU subframes.

Example 45 includes the subject matter of any one of Examples 33-44, and optionally, wherein the wireless communication band is a Directional Multi-Gigabit (DMG) band.

Example 46 includes the subject matter of any one of Examples 33-45, and optionally, wherein the wireless station is a Directional Multi-Gigabit (DMG) Station (STA).

Example 47 includes a product comprising one or more tangible computer-readable non-transitory storage media comprising computer-executable instructions operable to, when executed by at least one computer processor, enable the at least one computer processor to implement one or more operations at a wireless station, the operations comprising generating a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and transmitting the MU PPDU to the plurality of users over a wireless communication band.

Example 48 includes the subject matter of Example 47, and optionally, wherein each MPDU of the plurality of MPDUs, except for the longest MPDU, is followed by a PHY padding portion extending to the end of the longest MPDU.

Example 49 includes the subject matter of Example 47 or 48, and optionally, wherein at least one PHY padding portion of the one or more PHY padding portions is followed by at least one PHY field.

Example 50 includes the subject matter of Example 49, and optionally, wherein the longest MPDU is followed by the at least one PHY field.

Example 51 includes the subject matter of Example 49 or 50, and optionally, wherein each of the PHY padding portions is followed by the at least one PHY field.

Example 52 includes the subject matter of any one of Examples 49-51, and optionally, wherein the at least one PHY field comprises at least one field selected from the group consisting of an Automatic Gain Control (AGC) field, and a Training (TRN) field.

Example 53 includes the subject matter of any one of Examples 49-52, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 54 includes the subject matter of any one of Examples 49-53, and optionally, wherein the MU PPDU comprises a legacy header field followed by at least one non-legacy header field, the non-legacy header field comprising the indication of the plurality of lengths.

Example 55 includes the subject matter of Example 54, and optionally, wherein the legacy header comprises a length field to indicate a length of at least the longest MPDU.

Example 56 includes the subject matter of any one of Examples 49-55, and optionally, wherein the one or more PHY padding portions comprise at least one dummy PHY data block.

Example 57 includes the subject matter of any one of Examples 49-56, and optionally, wherein the one or more PHY padding portions comprise at least one dummy Training field.

Example 58 includes the subject matter of any one of Examples 49-57, and optionally, wherein an MPDU of the plurality of MPDUs comprises an Aggregate MPDU (A-MPDU) comprising a plurality of A-MPDU subframes.

Example 59 includes the subject matter of any one of Examples 49-58, and optionally, wherein the wireless communication band is a Directional Multi-Gigabit (DMG) band.

Example 60 includes the subject matter of any one of Examples 49-59, and optionally, wherein the wireless station is a Directional Multi-Gigabit (DMG) Station (STA).

Example 61 includes an apparatus of wireless communication by a wireless station, the apparatus comprising means for generating a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and means for processing transmission of the MU PPDU to the plurality of users over a wireless communication band.

Example 62 includes the subject matter of Example 61, and optionally, wherein each MPDU of the plurality of MPDUs, except for the longest MPDU, is followed by a PHY padding portion extending to the end of the longest MPDU.

Example 63 includes the subject matter of Example 61 or 62, and optionally, wherein at least one PHY padding portion of the one or more PHY padding portions is followed by at least one PHY field.

Example 64 includes the subject matter of Example 63, and optionally, wherein the longest MPDU is followed by the at least one PHY field.

Example 65 includes the subject matter of Example 63 or 64, and optionally, wherein each of the PHY padding portions is followed by the at least one PHY field.

Example 66 includes the subject matter of any one of Examples 63-65, and optionally, wherein the at least one PHY field comprises at least one field selected from the group consisting of an Automatic Gain Control (AGC) field, and a Training (TRN) field.

Example 67 includes the subject matter of any one of Examples 61-66, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 68 includes the subject matter of any one of Examples 61-67, and optionally, wherein the MU PPDU comprises a legacy header field followed by at least one non-legacy header field, the non-legacy header field comprising the indication of the plurality of lengths.

Example 69 includes the subject matter of Example 68, and optionally, wherein the legacy header comprises a length field to indicate a length of at least the longest MPDU.

Example 70 includes the subject matter of any one of Examples 61-69, and optionally, wherein the one or more PHY padding portions comprise at least one dummy PHY data block.

Example 71 includes the subject matter of any one of Examples 61-70, and optionally, wherein the one or more PHY padding portions comprise at least one dummy Training field.

Example 72 includes the subject matter of any one of Examples 61-71, and optionally, wherein an MPDU of the plurality of MPDUs comprises an Aggregate MPDU (A-MPDU) comprising a plurality of A-MPDU subframes.

Example 73 includes the subject matter of any one of Examples 61-72, and optionally, wherein the wireless communication band is a Directional Multi-Gigabit (DMG) band.

Example 74 includes the subject matter of any one of Examples 61-73, and optionally, wherein the wireless station is a Directional Multi-Gigabit (DMG) Station (STA).

Example 75 includes a method to be performed at a wireless station, the method comprising processing a received Multi-User (MU) Physical Layer Convergence Protocol (PLCP) Protocol Data Unit (PPDU) comprising a header field and a plurality of Media Access Control (MAC) Protocol Data Units (MPDUs), the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and processing a received MPDU addressed to the wireless station, based on a length of the MPDU indicated by the header field.

Example 76 includes the subject matter of Example 75, and optionally, wherein each MPDU of the plurality of MPDUs, except for the longest MPDU, is followed by a PHY padding portion extending to the end of the longest MPDU.

Example 77 includes the subject matter of Example 75 or 76, and optionally, comprising processing at least one PHY field after a PHY padding portion following the MPDU.

Example 78 includes the subject matter of Example 77, and optionally, wherein the longest MPDU is followed by the at least one PHY field.

Example 79 includes the subject matter of Example 77 or 78, and optionally, wherein each of the PHY padding portions is followed by the at least one PHY field.

Example 80 includes the subject matter of any one of Examples 77-79, and optionally, wherein the at least one PHY field comprises at least one field selected from the group consisting of an Automatic Gain Control (AGC) field, and a Training (TRN) field.

Example 81 includes the subject matter of any one of Examples 75-80, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 82 includes the subject matter of any one of Examples 75-81, and optionally, wherein the MU PPDU comprises a legacy header field followed by at least one non-legacy header field, the non-legacy header field comprising the indication of the plurality of lengths.

Example 83 includes the subject matter of Example 82, and optionally, wherein the legacy header comprises a length field to indicate a length of at least the longest MPDU.

Example 84 includes the subject matter of any one of Examples 75-83, and optionally, wherein the one or more PHY padding portions comprise at least one dummy PHY data block.

Example 85 includes the subject matter of any one of Examples 75-84, and optionally, wherein the one or more PHY padding portions comprise at least one dummy Training field.

Example 86 includes the subject matter of any one of Examples 75-85, and optionally, wherein the MPDU addressed to the wireless station comprises an Aggregate MPDU (A-MPDU) comprising a plurality of A-MPDU subframes.

Example 87 includes the subject matter of any one of Examples 75-86, and optionally, comprising processing reception of the MU PPDU over a Directional Multi-Gigabit (DMG) band.

Example 88 includes the subject matter of any one of Examples 75-87, and optionally, wherein the wireless station is a Directional Multi-Gigabit (DMG) Station (STA).

Example 89 includes a product comprising one or more tangible computer-readable non-transitory storage media comprising computer-executable instructions operable to, when executed by at least one computer processor, enable the at least one computer processor to implement one or more operations at a wireless station, the operations comprising processing a received Multi-User (MU) Physical Layer Convergence Protocol (PLCP) Protocol Data Unit (PPDU) comprising a header field and a plurality of Media Access Control (MAC) Protocol Data Units (MPDUs), the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and processing a received MPDU addressed to the wireless station, based on a length of the MPDU indicated by the header field.

Example 90 includes the subject matter of Example 89, and optionally, wherein each MPDU of the plurality of MPDUs, except for the longest MPDU, is followed by a PHY padding portion extending to the end of the longest MPDU.

Example 91 includes the subject matter of Example 89 or 90, and optionally, wherein the operations comprise processing at least one PHY field after a PHY padding portion following the MPDU.

Example 92 includes the subject matter of Example 91, and optionally, wherein the longest MPDU is followed by the at least one PHY field.

Example 93 includes the subject matter of Example 91 or 92, and optionally, wherein each of the PHY padding portions is followed by the at least one PHY field.

Example 94 includes the subject matter of any one of Examples 91-93, and optionally, wherein the at least one PHY field comprises at least one field selected from the group consisting of an Automatic Gain Control (AGC) field, and a Training (TRN) field.

Example 95 includes the subject matter of any one of Examples 89-94, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 96 includes the subject matter of any one of Examples 89-95, and optionally, wherein the MU PPDU comprises a legacy header field followed by at least one non-legacy header field, the non-legacy header field comprising the indication of the plurality of lengths.

Example 97 includes the subject matter of Example 96, and optionally, wherein the legacy header comprises a length field to indicate a length of at least the longest MPDU.

Example 98 includes the subject matter of any one of Examples 89-97, and optionally, wherein the one or more PHY padding portions comprise at least one dummy PHY data block.

Example 99 includes the subject matter of any one of Examples 89-98, and optionally, wherein the one or more PHY padding portions comprise at least one dummy Training field.

Example 100 includes the subject matter of any one of Examples 89-99, and optionally, wherein the MPDU addressed to the wireless station comprises an Aggregate MPDU (A-MPDU) comprising a plurality of A-MPDU subframes.

Example 101 includes the subject matter of any one of Examples 89-100, and optionally, wherein the operations comprise processing reception of the MU PPDU over a Directional Multi-Gigabit (DMG) band.

Example 102 includes the subject matter of any one of Examples 89-101, and optionally, wherein the wireless station is a Directional Multi-Gigabit (DMG) Station (STA).

Example 103 includes an apparatus of wireless communication by a wireless station, the apparatus comprising means for processing reception of a Multi-User (MU) Physical Layer Convergence Protocol (PLCP) Protocol Data Unit (PPDU) comprising a header field and a plurality of Media Access Control (MAC) Protocol Data Units (MPDUs) to a respective plurality of users, the header field comprising an indication of a plurality of lengths of respective ones of the plurality of MPDUs, one or more MPDUs of the plurality of MPDUs being followed by one or more respective PHY padding portions extending to an end of a longest MPDU of the plurality of MPDUs; and means for processing reception of an MPDU addressed to the wireless station, based on a length of the MPDU indicated by the header field.

Example 104 includes the subject matter of Example 103, and optionally, wherein each MPDU of the plurality of MPDUs, except for the longest MPDU, is followed by a PHY padding portion extending to the end of the longest MPDU.

Example 105 includes the subject matter of Example 103 or 104, and optionally, comprising means for processing at least one PHY field after a PHY padding portion following the MPDU.

Example 106 includes the subject matter of Example 105, and optionally, wherein the longest MPDU is followed by the at least one PHY field.

Example 107 includes the subject matter of Example 105 or 106, and optionally, wherein each of the PHY padding portions is followed by the at least one PHY field.

Example 108 includes the subject matter of any one of Examples 105-107, and optionally, wherein the at least one PHY field comprises at least one field selected from the group consisting of an Automatic Gain Control (AGC) field, and a Training (TRN) field.

Example 109 includes the subject matter of any one of Examples 103-108, and optionally, wherein the plurality of MPDUs comprise at least one first MPDU having a first MPDU length, and at least one second MPDU having a second MPDU length, different from the first MPDU length, the first MPDU followed by a first PHY padding portion having a first padding length, and the second MPDU followed by a second padding portion having a second padding length, a sum of the first MPDU length and the first padding length being equal to a sum of the second MPDU length and the second padding length.

Example 110 includes the subject matter of any one of Examples 103-109, and optionally, wherein the MU PPDU comprises a legacy header field followed by at least one non-legacy header field, the non-legacy header field comprising the indication of the plurality of lengths.

Example 111 includes the subject matter of Example 110, and optionally, wherein the legacy header comprises a length field to indicate a length of at least the longest MPDU.

Example 112 includes the subject matter of any one of Examples 103-111, and optionally, wherein the one or more PHY padding portions comprise at least one dummy PHY data block.

Example 113 includes the subject matter of any one of Examples 103-112, and optionally, wherein the one or more PHY padding portions comprise at least one dummy Training field.

Example 114 includes the subject matter of any one of Examples 103-113, and optionally, wherein the MPDU addressed to the wireless station comprises an Aggregate MPDU (A-MPDU) comprising a plurality of A-MPDU subframes.

Example 115 includes the subject matter of any one of Examples 103-114, and optionally, comprising means for processing reception of the MU PPDU over a Directional Multi-Gigabit (DMG) band.

Example 116 includes the subject matter of any one of Examples 103-115, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station to:
generate a Multi-User (MU) Physical Layer Protocol Data Unit (PPDU) comprising a first header (L-header) field decodable by Directional Multi-Gigabit (DMG) stations, a second header (Header A) field after the L-header field, a third header (Header B) field after the Header A field, and a data field after the Header B field, the data field comprising a plurality of data units addressed to a plurality of stations (STAs), the Header A field comprising information of a number of Spatial Streams (SSs) to be transmitted to the plurality of STAs, the Header B field comprising a length field to indicate, for each STA of the plurality of STAs, a length of a data unit addressed to the STA; and
transmit said MU PPDU to said plurality of STAs over a frequency band above 45 Gigahertz (GHz).

2. The apparatus of claim 1, wherein the length field comprises the length of the data unit in octets.

3. The apparatus of claim 1, wherein the plurality of data units comprises a plurality of Medium Access Control (MAC) Protocol Data Units (MPDUs).

4. The apparatus of claim 1 configured to cause the wireless communication station to transmit the MU PPDU over a channel bandwidth comprising a plurality of 2.16 GHz channels, the Header A field comprises an indication of the plurality of 2.16 GHz channels.

5. The apparatus of claim 4, wherein the channel bandwidth comprises a channel bandwidth of 4.32 GHz or 6.48 GHz.

6. The apparatus of claim 1, wherein the MU PPDU comprises a Training (TRN) field after the data field.

7. The apparatus of claim 1, wherein the MU PPDU comprises a first Channel Estimation (CE) field before the L-header, a first Short Training Field (STF) before the first CE field, a second STF after the Header A field and before the Header B field, and a second CE field after the second STF and before the Header B field.

8. The apparatus of claim 1, wherein the MU PPDU comprises an Extended Directional Multi-Gigabit (EDMG) MU PPDU, the Header A field comprises an EDMG Header A field, and the Header B field comprises an EDMG Header B field.

9. The apparatus of claim 1 comprising a Medium Access Control (MAC), and a Physical Layer (PHY).

10. The apparatus of claim 1 comprising a radio.

11. The apparatus of claim 1 comprising one or more antennas.

12. A product comprising one or more tangible computer-readable non-transitory storage media comprising computer-executable instructions operable to, when executed by at least one processor, enable the at least one processor to cause a wireless communication station to:
generate a Multi-User (MU) Physical Layer Protocol Data Unit (PPDU) comprising a first header (L-header) field decodable by Directional Multi-Gigabit (DMG) stations, a second header (Header A) field after the L-header field, a third header (Header B) field after the Header A field, and a data field after the Header B field, the data field comprising a plurality of data units addressed to a plurality of stations (STAs), the Header A field comprising information of a number of Spatial Streams (SSs) to be transmitted to the plurality of STAs, the Header B field comprising a length field to indicate, for each STA of the plurality of STAs, a length of a data unit addressed to the STA; and
transmit said MU PPDU to said plurality of STAs over a frequency band above 45 Gigahertz (GHz).

13. The product of claim 12, wherein the length field comprises the length of the data unit in octets.

14. The product of claim 12, wherein the plurality of data units comprises a plurality of Medium Access Control (MAC) Protocol Data Units (MPDUs).

15. The product of claim 12, wherein the instructions, when executed, cause the wireless communication station to transmit the MU PPDU over a channel bandwidth comprising a plurality of 2.16 GHz channels, the Header A field comprises an indication of the plurality of 2.16 GHz channels.

16. The product of claim 15, wherein the channel bandwidth comprises a channel bandwidth of 4.32 GHz or 6.48 GHz.

17. The product of claim 12, wherein the MU PPDU comprises a Training (TRN) field after the data field.

18. The product of claim 12, wherein the MU PPDU comprises a first Channel Estimation (CE) field before the L-header, a first Short Training Field (STF) before the first CE field, a second STF after the Header A field and before the Header B field, and a second CE field after the second STF and before the Header B field.

19. The product of claim 12, wherein the MU PPDU comprises an Extended Directional Multi-Gigabit (EDMG) MU PPDU, the Header A field comprises an EDMG Header A field, and the Header B field comprises an EDMG Header B field.

20. An apparatus comprising logic and circuitry configured to cause a first wireless communication station to:
receive a Multi-User (MU) Physical Layer Protocol Data Unit (PPDU) from a second wireless communication station over a frequency band above 45 Gigahertz (GHz), the MU PPDU comprising a first header (L-header) field decodable by Directional Multi-Gigabit (DMG) stations, a second header (Header A) field after the L-header field, a third header (Header B) field after the Header A field, and a data field after the Header B field, the data field comprising a plurality of data units addressed to a plurality of stations (STAs), the plurality of data units comprising a data unit addressed to the first wireless communication station, the Header A field comprising information of a number of Spatial Streams (SSs) to be transmitted to the plurality of STAs, the Header B field comprising a length field to indicate, for each STA of the plurality of STAs, a length of a data unit addressed to the STA; and
process the data unit addressed to the first wireless communication station.

21. The apparatus of claim 20, wherein the length field comprises a length in octets of the data unit addressed to the first wireless communication station.

22. The apparatus of claim 20, wherein the data unit addressed to the first wireless communication station comprises a Medium Access Control (MAC) Protocol Data Unit (MPDU).

23. The apparatus of claim 20 configured to cause the first wireless communication station to receive the MU PPDU over a channel bandwidth comprising a plurality of 2.16 GHz channels, the Header A field comprises an indication of the plurality of 2.16 GHz channels.

24. The apparatus of claim 23, wherein the channel bandwidth comprises a channel bandwidth of 4.32 GHz or 6.48 GHz.

25. The apparatus of claim 20, wherein the MU PPDU comprises a Training (TRN) field after the data field.

26. The apparatus of claim 20, wherein the MU PPDU comprises a first Channel Estimation (CE) field before the L-header, a first Short Training Field (STF) before the first CE field, a second STF after the Header A field and before the Header B field, and a second CE field after the second STF and before the Header B field.

27. The apparatus of claim 20, wherein the MU PPDU comprises an Extended Directional Multi-Gigabit (EDMG) MU PPDU, the Header A field comprises an EDMG Header A field, and the Header B field comprises an EDMG Header B field.

28. The apparatus of claim 20 comprising a Medium Access Control (MAC), and a Physical Layer (PHY).

29. The apparatus of claim 20 comprising a radio.

30. The apparatus of claim 20 comprising one or more antennas.

31. A product comprising one or more tangible computer-readable non-transitory storage media comprising computer-executable instructions operable to, when executed by at least one processor, enable the at least one processor to cause a first wireless communication station to:
receive a Multi-User (MU) Physical Layer Protocol Data Unit (PPDU) from a second wireless communication station over a frequency band above 45 Gigahertz (GHz), the MU PPDU comprising a first header (L-header) field decodable by Directional Multi-Gigabit (DMG) stations, a second header (Header A) field after the L-header field, a third header (Header B) field after the Header A field, and a data field after the Header B field, the data field comprising a plurality of data units addressed to a plurality of stations (STAs), the plurality of data units comprising a data unit addressed to the first wireless communication station, the Header A field comprising information of a number of Spatial Streams (SSs) to be transmitted to the plurality of STAs, the Header B field comprising a length field to indicate, for each STA of the plurality of STAs, a length of a data unit addressed to the STA; and
process the data unit addressed to the first wireless communication station.

32. The product of claim 31, wherein the length field comprises a length in octets of the data unit addressed to the first wireless communication station.

33. The product of claim 31, wherein the data unit addressed to the first wireless communication station comprises a Medium Access Control (MAC) Protocol Data Unit (MPDU).

34. The product of claim 31, wherein the instructions, when executed, cause the first wireless communication station to receive the MU PPDU over a channel bandwidth comprising a plurality of 2.16 GHz channels, the Header A field comprises an indication of the plurality of 2.16 GHz channels.

35. The product of claim 34, wherein the channel bandwidth comprises a channel bandwidth of 4.32 GHz or 6.48 GHz.

36. The product of claim 31, wherein the MU PPDU comprises a Training (TRN) field after the data field.

37. The product of claim 31, wherein the MU PPDU comprises a first Channel Estimation (CE) field before the L-header, a first Short Training Field (STF) before the first CE field, a second STF after the Header A field and before the Header B field, and a second CE field after the second STF and before the Header B field.

38. The product of claim 31, wherein the MU PPDU comprises an Extended Directional Multi-Gigabit (EDMG) MU PPDU, the Header A field comprises an EDMG Header A field, and the Header B field comprises an EDMG Header B field.

* * * * *